A. W. CASH.
VALVE.
APPLICATION FILED JUNE 4, 1908.
909,545.
Patented Jan. 12, 1909.
2 SHEETS—SHEET 1.
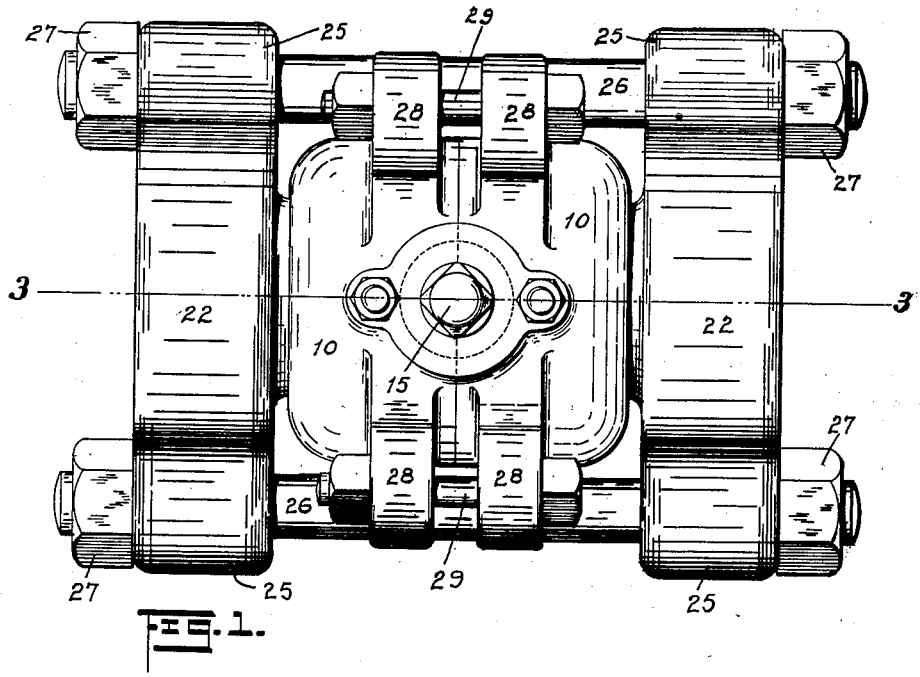
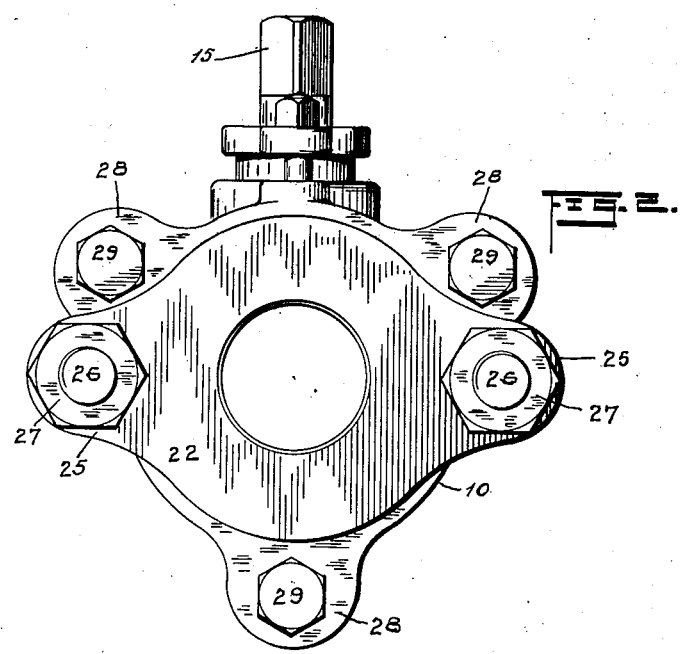
WITNESSES
Frederick Germand Jr.
John W. Kamper.
INVENTOR
Arthur W. Cash,
BY
Russell M. Everett,
ATTORNEY.

A. W. CASH.
VALVE.
APPLICATION FILED JUNE 4, 1908.
909,545.
Patented Jan. 12, 1909.
2 SHEETS—SHEET 2.
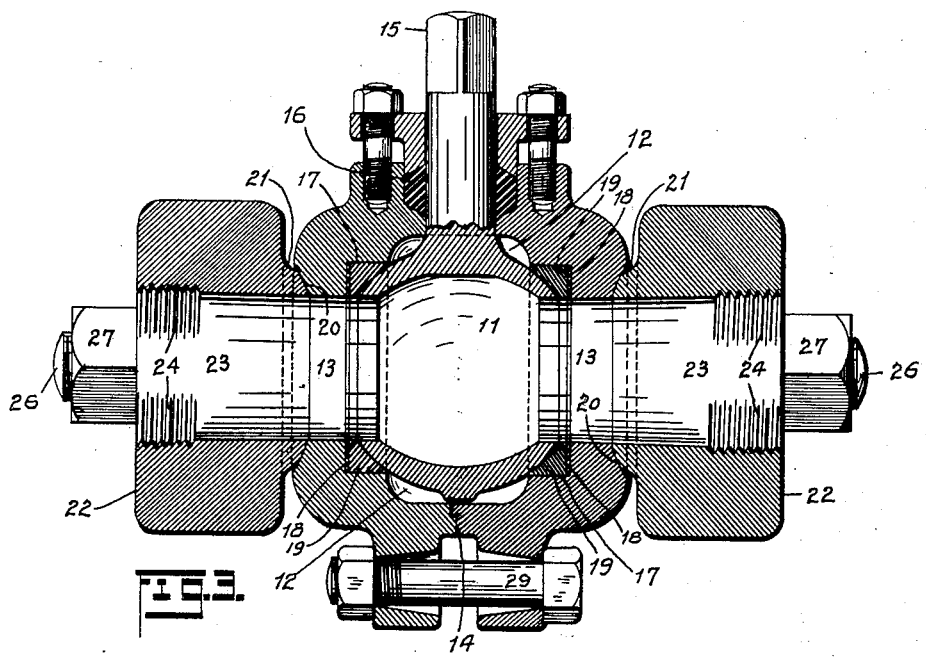
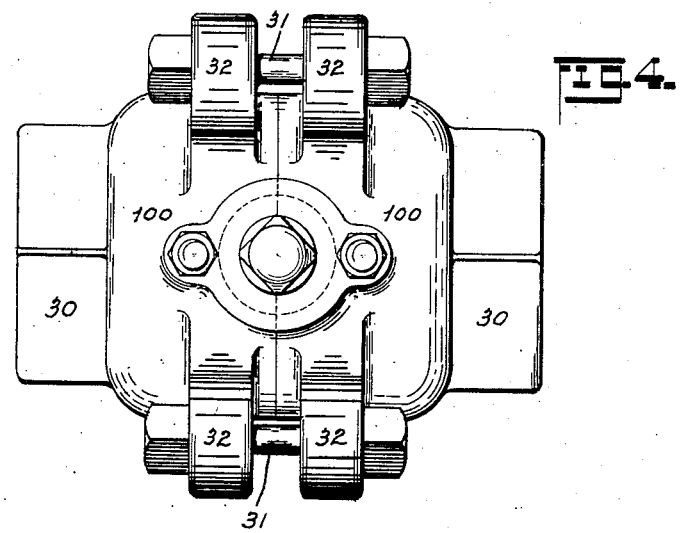
WITNESSES
INVENTOR
ATTORNEY.

UNITED STATES PATENT OFFICE.

ARTHUR W. CASH, OF NEWARK, NEW JERSEY.

VALVE.

No. 909,545.

Specification of Letters Patent.

Patented Jan. 12, 1909.

Application filed June 4, 1908. Serial No. 436,553.

*To all whom it may concern:*

Be it known that I, ARTHUR W. CASH, a citizen of the United States, residing at Newark, in the county of Essex and State of New Jersey, have invented certain Improvements in Valves, of which the following is a specification.

The objects of this invention are to secure a construction impervious to leakage; to enable the valve proper to be readily adjusted in its seat to take up wear; to facilitate removal and replacement of the valve; to provide easy access to the different parts of the valve, and removable valve seats which can be readily renewed; to secure a strong construction, not liable to get out of order, and to obtain other advantages and results as may be brought out in the following description.

Referring to the accompanying drawings, in which like numerals of reference indicate the same parts in the several figures, Figure 1 is a plan of my improved valve in its preferred form; Fig. 2 is an end view of the same, and Fig. 3 a vertical central longitudinal section on line 3—3, Fig. 1; Fig. 4 shows in plan a slightly modified construction.

In said drawings, 10, 10 indicate the two sections or halves of the valve casing which are adapted to be clamped firmly together by bolts and hold between themselves the valve proper 11 in operative engagement with annular seat rings 19, 19. Each casing section 10 is chambered at its face next the other, as at 12, and has a port 13 extending centrally rearward from said chamber. Around the said chambers 12 the sections have annular surfaces 14 adapted to fit tightly together. Preferably these joining faces 14 are stepped, as shown, so that when they are brought together, the casing sections and particularly the seat rings thereof are held in perfect alinement. This is easily and accurately accomplished, since the joining surface 14 and entire interior of each valve casing section is turned at one operation in a lathe.

Within the space formed by the chambers 12 is arranged the valve proper 11 which is provided with an integral spindle 15 projecting outwardly through the chamber casing in the plane of division of its sections, with a suitable stuffing box and packing 16 to prevent leakage. The valve proper is adapted to be rotated by this spindle, its side surfaces fitting imperviously against seat rings arranged in the chamber casing sections at the mouths of the ports 13. The valve proper itself is hollow or bored transversely, so as to register with the said ports 13 and place them in communication, when turned into position as shown in Fig. 3. In another position at right angles to the one shown in Fig. 3, the openings of the valve proper will obviously be out of alinement with the ports, and the solid sides of the valve proper will close said ports. Preferably the valve proper 11 is spherical, as shown, but obviously its dimension in the direction of the length of the spindle 15 could be varied so long as all planes at right angles to the length of the spindle cut the surface of the valve proper in circles, so that its sides always engaged the seat rings notwithstanding rotation. The shape of the valve proper could thus vary from a sphere to a cylinder, but for practical reasons the spherical form is best to manufacture and easiest to fit perfectly.

The seats for the valve proper in the casing sections are provided by annularly recessing the interior walls of each section at the union of its port 13 with the chamber 12, as at 17. Into this recess is then placed a bed or layer 18 of yielding or soft material, such as rubber, asbestos or the like, and upon the said cushion 18 is arranged a seat ring 19, which is of somewhat harder material, such as rubber mixed with asbestos, metal, or various other compositions commonly used for valve seats. This seat ring 19 projects slightly into the chamber 12 so that the valve proper engages it alone, and further distant from the recess 17, a considerable space is left between the walls of the valve proper and walls of the chamber 12, as is shown. This space not only avoids a metal to metal contact, which my invention is designed to prevent, but furthermore provides a space to receive sediment, scale or other foreign matter which may creep into the valve and which would cut, abrade and destroy its working surfaces if retained therebetween. The said space between the two seat rings, in the chamber 12, insures a harmless retention of such foreign matter until the valve is cleaned. The seat ring 19 is of course shaped at its exposed surface to fit the valve proper, that is, it is spherically concaved transversely of itself, as shown. It will be noted that the recesses 17 open at one side into the ports 13 and at their ends into the chamber 12. Thus not only the seat rings 19 are freely exposed to the valve proper 11, but also the beds or layers 18 are freely exposed at their inner edges to the passageway of the ports. Thus as the valve sections are clamped together in assembling the valve, superfluous portions of the beds or layers 18 may be squeezed out or escape into the ports. Perfect fit of the various parts of the valve one to another is thus secured.

Preferably the outer side of each section 10 has around the port 13 an annular spherically concave bearing 20 which receives a correspondingly shaped annular extension or projection 21 on a coupling member 22, said coupling member having a passage 23 in alinement with the port 13 and being threaded at its other end as at 24 to receive the pipe to which the valve is to be fitted. Each of these coupling members 22 at opposite ends of the valve, has at its opposite sides extensions 25, 25, which project outwardly beyond the sides of the valve and its casing, and are adapted to receive bolts 26 extending longitudinally of the pipe line and provided with tightening nuts 27. Obviously these bolts 26 bind together not only the couplings 22 and the valve casing as a whole, but they also serve to bind together the two sections 10, 10 of the valve casing. The said curved bearings 20 are preferably spherically concaved and are for the purpose of securing proper contact of the coupled members in case the pipes or threaded connections are not in true alinement, as is common. Any one of the four bearing surfaces, between the couplings and the valve casing or between the valve proper and its seat rings, is therefore readily accessible by simply loosening the bolts 26. Preferably, the valve casing sections 10 have lugs 28 by which said sections can be held together with small bolts 29. The purpose of this is that when a valve is to be entirely removed and another one substituted, the large bolts 25 need only be loosened a little, when the valve can be slipped out without its casing sections falling apart, or such a removed valve can be handled or transported conveniently as an entirety. Obviously, upon removal of the small bolts 29, the valve casing sections 10, 10 can be separated to get at the valve seats, and the valve proper or the seat rings can be removed. In this way the seat rings can be readily and conveniently renewed as needed, or different kinds of seat rings can be inserted at different times to adapt the valve to different uses and conditions. The scope and range of usefulness of the valve, and its adaptability, are therefore greatly increased.

Obviously, under conditions where the coupling members 22 are not employed, the ends of the pipe are threaded directly into the ends 30 of valve casing sections 100, 100, as shown in Fig. 4, and short bolts 31 engaging lugs 32 of the two valve casing sections 100, 100, are employed for connecting said sections.

While I have shown and described the spindle 15 of the valve proper as being integral therewith, and prefer to make the same so, it will be understood that the spindle could be made in a separate piece and suitably connected to the valve so as to be rigid and strong. Any suitable construction of this feature of the valve could be employed without departing from the spirit and scope of the invention. The integral spindle is the most satisfactory however, and the sectional construction of the valve casing above described provides for its ready and convenient assembling, as claimed below.

Having thus described the invention, what I claim as new is:

1. In a valve, the combination of a casing comprising sections forming between themselves an inclosed chamber and having ports leading into said chamber from opposite sides thereof and annular recesses at the inner ends of said ports, seat rings in said recesses, a valve proper simultaneously engaging both said seat rings and adapted to rotate within said chamber to place said ports in communication or to close them, means for joining said casing sections together, and means for turning said valve.

2. In a valve, the combination of a casing comprising sections forming between themselves a chamber and having ports leading into said chamber from opposite sides thereof and annular recesses at the inner ends of said ports, seat rings in said recesses, a valve proper having a perforated body simultaneously engaging both said rings and a spindle projecting from said body between said casing sections, and means for forcing said casing sections together to bring said seat rings into impervious relation to said valve proper.

3. In a valve, the combination of a casing comprising sections forming between themselves an inclosed chamber and having ports leading into said chamber from opposite sides thereof and concentric annular outer and inner recesses at the meeting ends of said sections, seat rings in said inner recesses, a rotary valve between said seat rings, the said outer recesses being at the meeting edges of the sections and said edges thus adapted to fit together and position the sections with the said seat rings at opposite sides of the valve, and means for joining said casing sections together.

4. In a valve, the combination of a casing comprising sections forming between themselves an inclosed chamber and having ports leading into said chamber from opposite sides thereof and annular recesses at the inner ends of said ports, flat annular cushions in said recesses presenting free inner edges to the passageway of said ports, seat rings in said recesses upon said cushions, a valve proper between and engaging said seat rings adapted to rotate within said chamber to place said ports in communication or to close them, means for joining said casing sections together, and means for turning said valve.

5. The combination of a valve having casing sections providing chambers at their adjacent sides and bearings at their opposite outer sides, seat rings in said chambers, a valve proper between said sections fitting said seat rings, coupling members each fitting at one end the outer bearing of a casing section, and bolts extending between said coupling members and holding the same in engagement with the casing sections and said casing sections in engagement with the valve proper.

ARTHUR W. CASH.

In the presence of—
ETHEL B. REED,
BERTHA S. FULTON.